United States Patent [19]
Harp

[11] 4,030,843
[45] June 21, 1977

[54] TRIPLE CORNER BORING BAR

[76] Inventor: Fredrick Eugene Harp, 733 W. Granite St., Siloam Springs, Ark. 72761

[22] Filed: Jan. 12, 1976

[21] Appl. No.: 648,747

[52] U.S. Cl. .................................. 408/197; 408/233
[51] Int. Cl.² ..................... B23B 27/16; B23B 29/02
[58] Field of Search .......... 408/713, 233, 197, 227, 408/231, 185, 189, 186, 163, 171, 172, 232; 29/105 R

[56] References Cited

UNITED STATES PATENTS

| | | | |
|---|---|---|---|
| 1,592,092 | 7/1926 | Forster | 408/197 X |
| 3,027,786 | 4/1962 | Severson | 408/197 |
| 3,300,834 | 1/1967 | Stone | 408/233 X |
| 3,782,849 | 1/1974 | Mizoguchi | 408/197 |

FOREIGN PATENTS OR APPLICATIONS

| | | | |
|---|---|---|---|
| 1,961,862 | 6/1971 | Germany | 408/233 |
| 74,968 | 10/1930 | Sweden | 408/233 |

*Primary Examiner*—J. Howard Flint, Jr.
*Assistant Examiner*—William R. Briggs
*Attorney, Agent, or Firm*—Clarence A. O'Brien; Harvey B. Jacobson

[57] ABSTRACT

A boring bar having a body with standard shank portion at one end and a fluted, adjustable portion at the other end thereof which rigidly supports two standard triangular carbide tips. The tips are adjustable simultaneously to the desired size by means of an accurately shaped and angled adjusting plug together with accurate angles formed in the fluted end of the bar itself.

3 Claims, 4 Drawing Figures

4,030,843

TRIPLE CORNER BORING BAR

BACKGROUND OF THE INVENTION

1. Field of the Invention

This invention relates generally to devices for boring accurate holes in metal and utilizes a fluted boring bar having two standard triangular carbide tips with a unique adjustment structure for changing the position of the tips in order to change the size of the hole to be bored.

2. Description of the Prior Art

Known prior milling and cutting devices use specially shaped and formed cutting tips and edges which must be provided especially for the particular device. This limits to some extent the use of the device and certainly increases the cost thereof. Also in many areas of the country a supply of replacement cutters and tips is not always readily available.

Another problem with known boring and cutting tools of the rotary type is that their adjustments are rather rough, and subject to variation under the stress and strain of the cutting and boring operation. Also in many of these devices the adjustments tend to change much more than desired during use.

Another common problem with known devices is that their cutting tips are not fixed against both radial and axial movements in a positive, secure manner. This causes a change in size of the hole being bored due to the variation in adjustment rather than through normal wear and tear of said tips.

Another problem with known tools is that since the cutting tips are specially sized and fitted for the specific tool, the tips are relatively expensive and not readily available which necessitates the re-working of the tips after they become worn rather than simply throwing them away. Tips which are inexpensive and of the throw-away type are much to be preferred.

Known prior art patents which may be pertinent to this invention are as follows:

J.T. Bennett; 3,125,799, Mar. 24, 1964.
W.J. Greenleaf; 3,205,559, Sept. 14, 1965.
C.E. Grueninger; 3,217,385, Nov. 16, 1965.

None of these known prior art devices offer the new and unique features of the invention disclosed herein.

SUMMARY OF THE INVENTION

An object of the present invention is to provide a boring bar which may be made available in a range of sizes and with each bar being capable of a limited range of adjustment within its particular size.

Another object of this invention is to provide a boring bar having a standard shank and a fluted end provided with two standard triangular carbide tips which are adjustable and replaceable.

A further object of this invention is to provide a boring bar utilizing readily obtainable triangular carbide tips which are adjustable and which after becoming worn can be discarded and replaced with new tips. The cost of the standard tips is so low that it is better to throw them away and replace them with new ones than to re-work them.

A still further object of this invention is to provide an adjustable boring bar which has an accurately formed angle in each of the fluted ends of the bar and an accurately angles adjustment plug for providing an accurately sized triangular area for supporting and receiving triangular shaped carbide tips.

An important feature of the boring bar of this invention is in the fact that the cutting edges are provided by two triangular shaped carbide tips of standard construction. These tips are readily available as a standard item from many manufacturers of carbide cutting devices.

Another important feature of this invention is that the two fluted sections at one end of the boring bar have accurately angled recesses therein for receiving the carbide tips and positively holding same at a desired cutting angle. Another important component of this device is the tapered adjusting plug used therewith which also has an accurately formed triangular tip engaging surface for complementing the angled surface of the fluted ends to securely and positively maintain the carbide tips at the proper cutting angle.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENT

Figure 1:
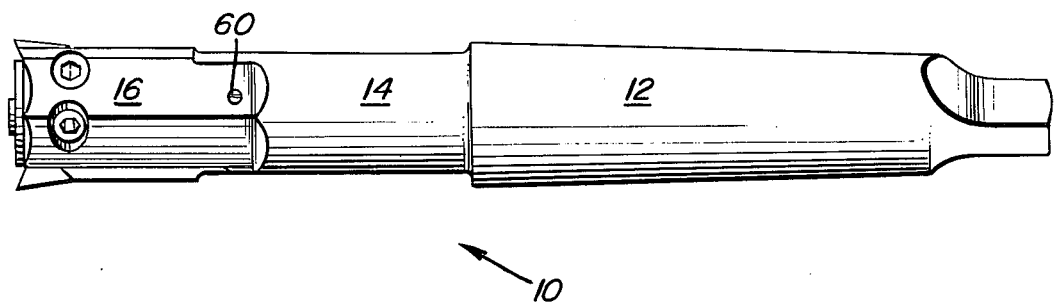
FIG. 1 is a top plan view of the boring bar of this invention.
Figure 2:
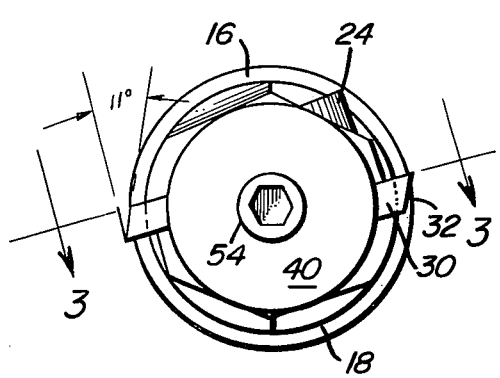
FIG. 2 is an end view of the fluted adjustable cutting end of the boring bar.

Referring to FIG. 1 of the drawings, reference numeral 10 indicates the boring bar of this invention. The boring bar has a standard shank portion 12 which is conventional and well known in the field. The reduced end 14 of the bar has fluted ends 16 and 18 provided thereon.

Figure 4:
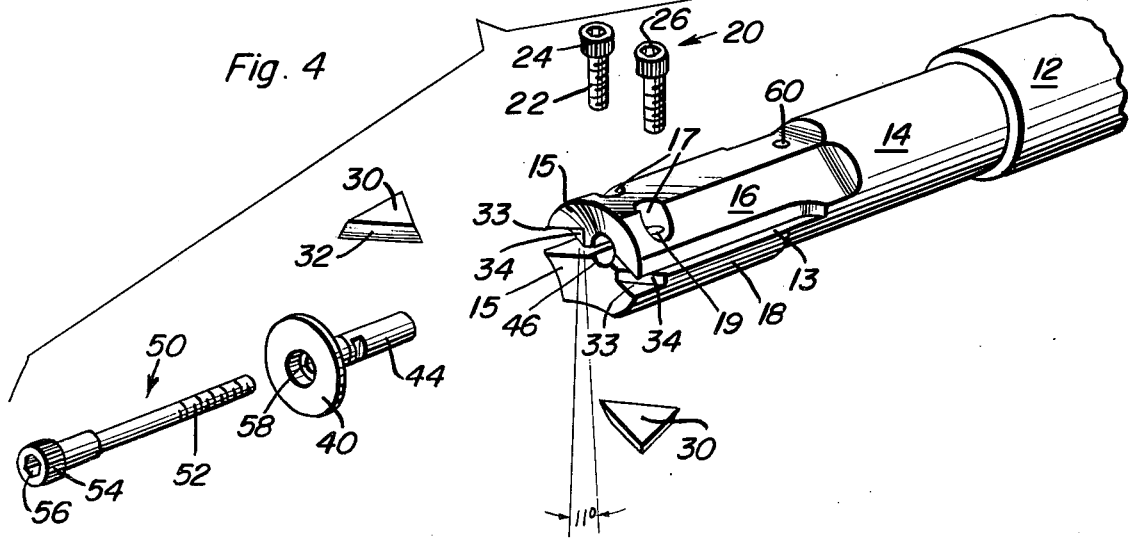
FIG. 4 is an exploded perspective view of the component parts of the boring bar device of this invention.

The component parts of the boring bar are best seen in the exploded view of FIG. 4. The end segments 16 and 18 have conical recesses 15 appropriately formed therein. The member 16 has additional recesses 17 provided near the end thereof with an aperture 19 extending from said recesses through the member to the slot 13. The member 18 is provided with holes directly aligned with the holes 19 in member 16 with said holes being tapped with screw threads for receiving the locking screws 20. The locking screws 20 have threaded portions 22 and knurled heads 24 with said heads each being provided with an Allen wrench receiving socket 26. These enlarged head type screws 20 freely pass through the apertures 19 of the member 16 and are then screwed into the threaded apertures 28 in the member 18. By tightening the screws 20 until the head portions 24 engage the bottom portion of the recesses 17 the two fluted members 16 and 18 may be drawn together by said screws since the slot 13 allows a slight amount of bending and flexing of the steel members 16 and 18.

A very important feature of this invention will now be described. The triangular shaped carbide cutting tips used with this invention are of standard construction and are readily available from manufacturers of carbide cutting elements. They come in various sizes and have varying degrees of corner radiuses. They generally are perfectly triangular which of course means that each corner angle is of 60°. These tips 30 also have side edges 32 which make a slight tapering angle relative to the flat front and back surfaces of said tips. This angle is approximately 11 degrees and is standard as supplied by the tip manufacturers. Each of the outer ends of members 16 and 18 have provided, opposite to each other, recessed portions 33 having an angular adjusting surface 34 at the bottom thereof. The angular surfaces 34 are extremely important to this device and looking at FIG. 3 can be seen as being of 32° from an axis perpendicular to the centerline of the boring bar. In addition to this 32° angle just described the face of each surface 34 also is precision cut to make an angle of approximately 11° from an axis passing through the vertical, as viewed in FIG. 3, to correspond with the 11 degree taper of the side edges 32 of the carbide tips 30. Thus it can be seen that the side of the carbide tip which engages the surface 34 of each of the fluted members 16 and 18 makes a solid and complete engagement along the entire surface thereof. This is very important to the maintaining of proper adjustment of said tips while the boring bar is being used.

Figure 3:
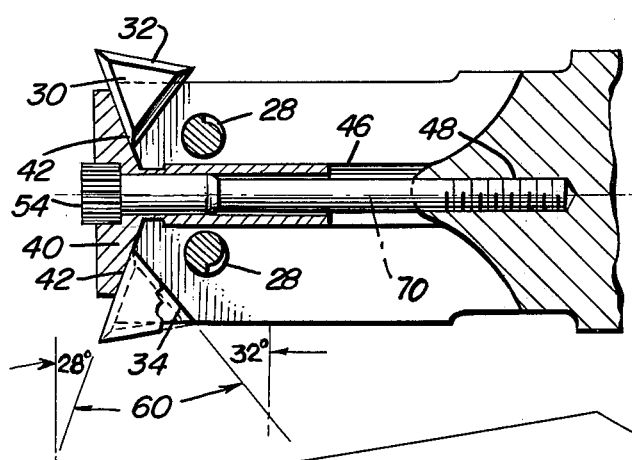
FIG. 3 is a cross-sectional view, in part, taken generally along line 3—3 of FIG. 2.

The other important component of this device is the tapered adjusting plug 40. This plug has a specially tapered conical surface 42 and a hub portion 44. The hub portion 44 smoothly fits into a hole 46 drilled at the centerline of the boring bar. A suitably tapped hole 48 is provided at the bottom of hole 46 and within the portion 14 of the bar, as best seen in FIG. 3. An adjusting bolt, much larger, but similar in configuration to the adjusting lock head-type screws 20 already described, is provided for fastening the adjusting plug 40 to the end of the tool. This adjusting bolt is provided with threaded portion 52 for engagement with the threaded hole 48 in the body of the tool and has a shank portion supporting an enlarged head 54 with an Allen wrench adjusting socket 56 therein. The enlarged head 54 will engage with the recessed seat 58 within the adjusting plug 40. As seen in FIG. 3, the head 54 will apply force to the adjusting plug 40 as the adjusting bolt 50 is screwed into the socket 48. The conical surface 42 (FIG. 3) is accurately machined to form an angle of 28° to a plane perpendicular to the centerline 70 of the boring tool. Thus this surface 42 at 28° complements the surfaces 34 on the ends of segments 16 and 18 of 32° to form an angle therebetween of 60°. This exactly complements the 60° angle of the tungsten carbide cutting tips. As can be visualized by looking at FIG. 3, if the screw 50 is unscrewed to permit the adjusting plug 40 to move to the left, the angle between surface 42 and surfaces 34 will be maintained at 60° but the size of the area between said surfaces will be increased and will permit the two triangular shaped tungsten carbide tips 30 to move inwardly toward the centerline of the tool. This will effectively reduce the cutting area of the tool. But while the cutting area of the tool is decreased none of the strength, rigidity or support for the carbide tips is lost. The tips are always maintained at the proper cutting angle with only the outer circumference of the tips being changed. This is a very, very important feature of this new and unique invention. Obviously, once the proper circumferential size is obtained, locking screws 20 are tightened to draw the segments 16 and 18 together and to firmly lock the tips 30 between same. An aperture 60 appropriately provided with screw threads is also provided in the well known manner.

From the above description it can readily be seen how the boring bar of this invention provides a strong, positive supporting structure for the easily replaceable triangular shaped tungsten carbide cutting tips. These tips may be quickly and easily replaced upon becoming worn at low cost for either the tips or for the labor required to replace same. The cutting accuracy of the boring bar of this invention is extremely high because of the tips once firmly locked into place do not change adjustment through ordinary usage thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A boring bar tool for triangular cutting inserts comprising: a body member having a centerline; a single slot diametrically across the distal end of the body member, said slot forming only two bendable segments of said body member; only two triangular cutting inserts; a recess portion in each segment formed by a side surface and an angular surface, said angular surface being disposed at an angle of about 32° from a plane perpendicular to said centerline and at an angle of about 11 degrees from an axis perpendicular to said centerline, each recess supporting a single triangular cutting insert; a central aperture along said centerline formed by opposing further recesses in said segments and aligned with a threaded portion in said body member; an adjusting plug means having a tapered conical end portion, a cylindrical hub portion and a bolt receiving aperture extending through the center of said portions, said tapered conical end portion being disposed at an angle of about 28° from said plane when said hub portion is received in said central aperture; an adjusting bolt means cooperating with said threaded portion to adjustably secure the plug means to said body member; and two clamping means cooperating with said segments to draw the bendable segments together to firmly lock each cutting insert as adjusted between said side surface and a portion of the opposed segement.

2. The structure set forth in claim 1, wherein the two triangular shaped cutting inserts each have three side faces thereon which make and angle of approximately 11° relative to the centerline between the face and back surfaces of said inserts 3. The structure set forth in claim 1, wherein the two clamping means include two enlarged head-type screws passing freely through apertures in one segment and engaging with the bottom of recesses adjacent said apertures, and threaded into threaded apertures provided in the other bendable segment.

* * * * *